United States Patent

[11] 3,578,898

[72] Inventors Irving Kuzminsky
Silver Spring;
Ray B. Kauffman, Seabrook, Md.
[21] Appl. No. 741,497
[22] Filed July 1, 1968
[45] Patented May 18, 1971
[73] Assignee Entron, Inc.
Silver Spring, Md.

[54] AUTOMATIC GAIN CONTROL FOR MULTI-CHANNEL TELEVISION SYSTEMS
6 Claims, 3 Drawing Figs.

[52] U.S. Cl. .................................................... 178/5.2, 325/308
[51] Int. Cl. .................................................... H04n 7/08
[50] Field of Search .................................................... 178/5.2, 7.1, 6 (PD), 72 (E); 325/308, 65, 8, 17, 400, 407, 408, 410; 330/22, 24, 29, 30, 31

[56] References Cited
UNITED STATES PATENTS

| | | | |
|---|---|---|---|
| 2,974,224 | 3/1961 | Ule | 325/407 |
| 3,064,195 | 11/1962 | Freen | 325/308 |
| 3,115,547 | 12/1963 | Tschannen | 325/411 |
| 3,283,063 | 11/1966 | Kawashima et al. | 325/65 |
| 3,451,003 | 6/1969 | Rheinfelder | 325/308 |

*Primary Examiner*—Richard Murray
*Assistant Examiner*—Alfred H. Eddleman
*Attorney*—Lawrence E. Laubscher

ABSTRACT: Automatic gain control means for a wide-band multichannel color television system, such as a community antenna TV system of the type in which the level of the pilot carrier controls the gain of the trunkline amplifiers. The invention is characterized in that the pilot carrier is modulated by a modulating signal that is a function of the sync signal stripped from the information signal of a given channel (specifically, channel 5). The pilot carrier signal is so modulated that the gain control is effected during the retrace time of the channel 5 signal, whereby any interference produced by the pilot carrier signal will not be visible on a television receiver and will therefore, not be objectionable.

INVENTORS
Irving Kuzminsky
Ray B. Kauffman
Lawrence E. Laubscher
ATTORNEY

INVENTORS
Irving Kuzminsky
Ray B. Kauffman
Lawrence E. Laubscher
ATTORNEY

AUTOMATIC GAIN CONTROL FOR MULTI-CHANNEL TELEVISION SYSTEMS

In community antenna television systems (CATV), a coaxial cable is generally used to carry the signals from the head end to the subscribers. Amplifiers are provided to compensate for the losses of the cable system, and since these losses vary with temperature, the repeater amplifiers normally incorporate automatic gain control means. Since there is a 4 MHz band between channels 4 and 5, the signal for controlling the gain of the repeater amplifiers is usually carried at 73.5 MHz. In addition, a second pilot carrier is sometimes used that is carried above channel 13, at 225 MHz, for example. Examples of such known systems are presented in the Pats. to Reid No. 3,054,858, Freen No. 3,064,195 and Mandell et al. No. 3,333,198, among others.

In practice, it has been discovered that a particular problem exists when a color television receiver is tuned to channel 5. More particularly, the modulation of channel 5 picture carrier by horizontal synchronizing pulses creates spectral components that beat with the pilot carrier in the mixer of the TV receiver to produce a component that is very close to the color subcarrier frequency. This creates a visible beat in the picture and causes false triggering and color bars in the black and white picture. While the interference may be minimized by setting the pilot carrier frequency midway between the frequencies where pairs of spectral components cause the beat, on some receivers even this minimized interference is still objectionable and can be reduced to a tolerable level only by trapping out the pilot carrier somewhere in the system ahead of the television receiver. The present invention was developed to make unnecessary any such trapping or critical setting of pilot carrier frequency, and to provide a unique and novel solution to this interference problem.

The primary object of the present invention is to provide an improved wide-band multichannel television distribution system including improved automatic gain control means operable in such a manner that any interference created thereby will not be visible on a television receiver. More particularly, the invention is characterized in that the pilot carrier signal is introduced to the system during retrace time of the channel 5 signal, either the horizontal or vertical blanking interval.

A more specific object of the invention is to provide an automatic gain control system including modulator means for pulse modulating the pilot carrier signal with a modulating signal the frequency of which is a function of the sync signal of a given channel of the system–specifically, channel 5. Sync stripper means are connected with the signal processing means associated with the given channel for removing the video component from the sync signal. Pulse generator means are locked on this sync signal to produce a modulating signal of like frequency that modulates the pilot carrier signal, the modulated output being then mixed with the composite signal on the coaxial line of the distribution system.

A more detailed object of the invention is to provide automatic gain controls means of the type described above including compensating means for automatically adjusting the width of the modulating pulses upon the absence of a signal on the given one channel. Detector means are operable to sense the direct-current level of the modulating pulses to feed back a control signal to the pulse generator means when the selected channel goes off the air or otherwise becomes inoperative. According to another feature, the control signal is also automatically adjusted to compensate for variations in ambient temperature that affect system components.

Other objects and advantages of the invention will become apparent from a study of the following specification, when viewed in the light of the accompanying drawing, in which.

Figure 1:
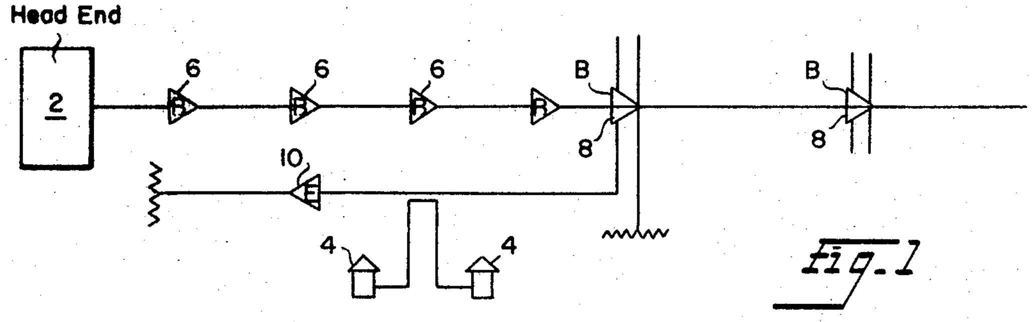
FIG. 1 is a schematic diagram of a conventional community antenna television distribution system.

Referring to FIG. 1, the conventional community antenna distribution system includes coaxial cable means for transmitting signals from the head end 2 to the subscribers 4, amplifier means including repeater amplifiers 6, bridging amplifiers 8 and extender amplifiers 10 being provided to compensate for the losses of the cable system. Because these losses vary with temperature, the repeater amplifiers 6 usually incorporate automatic gain control. The bridging amplifiers 8 and the extender amplifier 10 are not usually gain controlled, since the number of such amplifiers connected in cascade is small and the accumulation of variations is negligible The signal which controls the gain of the repeater amplifiers is usually carried at 73.5 MHz., since there is a 4 MHz band between channels 4 and 5. In addition, a second pilot carrier is sometimes used and may be carried above channel 13, at 225 MHz., for example.

Figure 2:
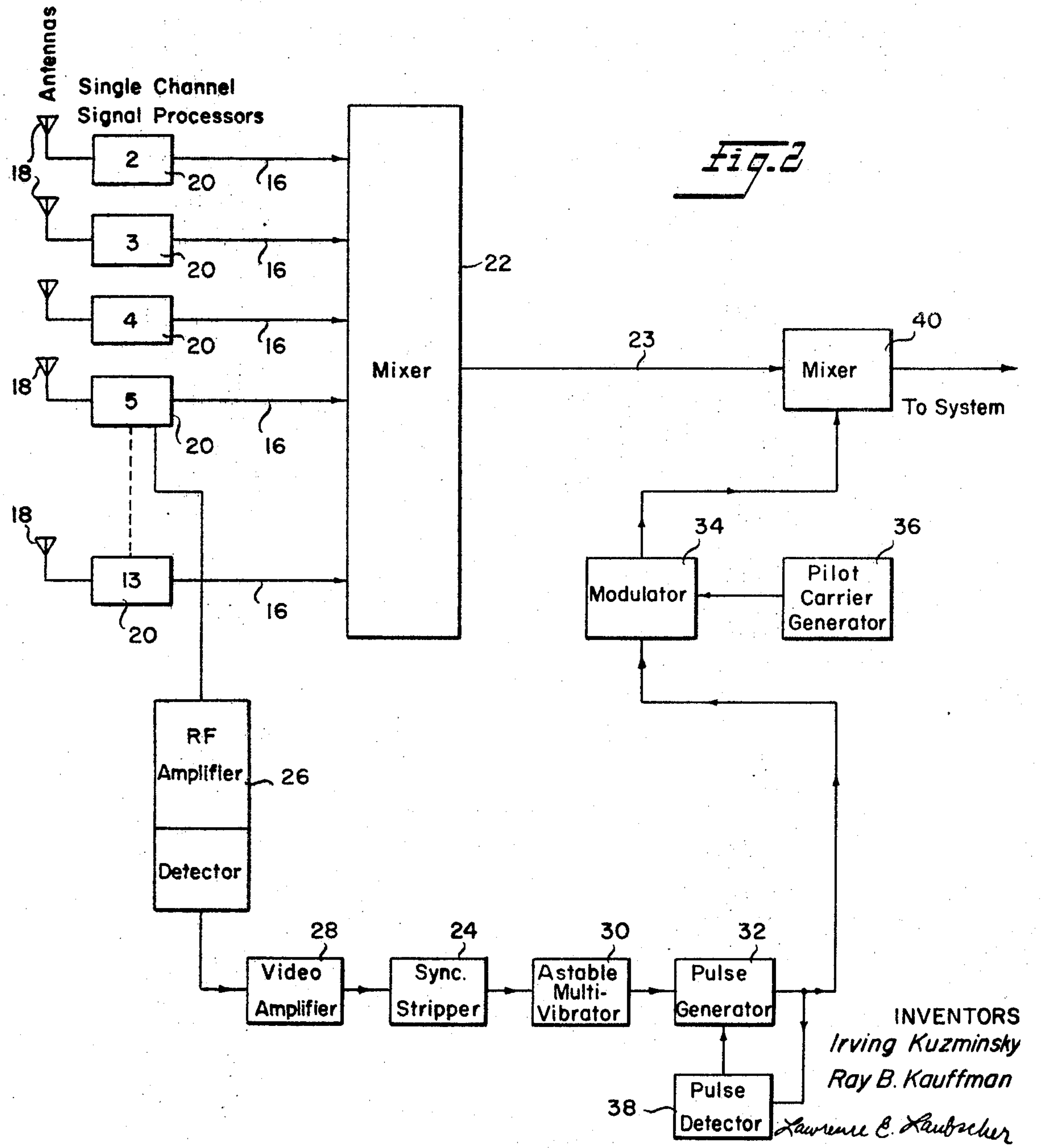
FIG. 2 is a block diagram of the head means of FIG. 1 including the automatic gain control means of the present invention.

Referring now to FIG. 2, the head-end 2 includes a plurality of channels 16 each including separate antenna and signal processing means 18 and 20, respectively, as is conventional in the art. The channels are connected with first mixer means 22 that combine the signals into a single coaxial cable 23 for distribution in the system.

In accordance with the present invention, a portion of the channel 5 signal is tapped off from the corresponding signal precessing means, and is fed to a sync stripper 24 via RF amplifier and detector 26, and video amplifier 28. As will be described in greater detail with reference to FIG. 3, the synchronizing signals stripped from channel 5 are fed to a free-running multivibrator 30 that drives a pulse generator 32 at a frequency corresponding to that of the channel 5 sync signal. The modulating signal output from the pulse generator is supplied to modulator 34 to modulate the pilot carrier signal produced by generator 36. Associated with the pulse generator 32 are compensating means including a pulse detector 38 that feeds back a pulse width control signal as a function of the DC level of the modulating pulses. The modulated pilot carrier signal–which comprises a series of RF pulses–is supplied from modulator 34 to second mixer means 40 for superposition on the system distribution signals and thereby control the gain of the repeater amplifiers.

Figure 3:
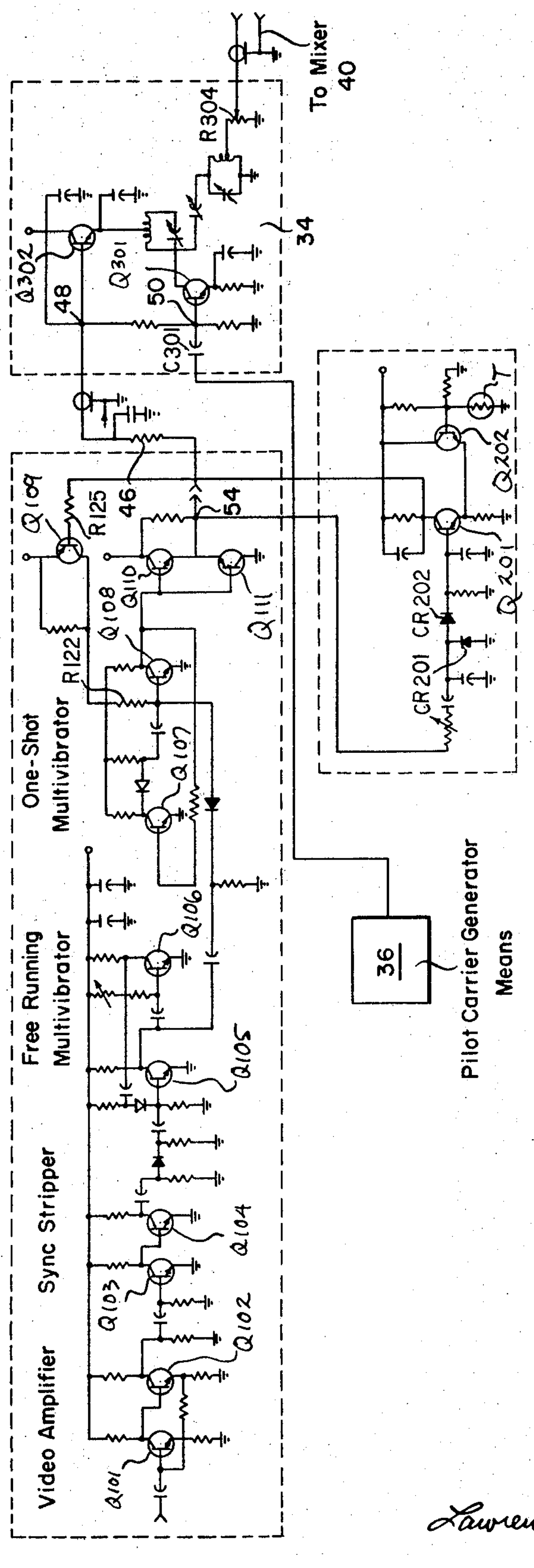
FIG. 3 is a detailed electrical diagram of the automatic gain control arrangement.

Referring now to FIG. 3, the amplifier means 28 comprises transistors Q101 and Q102 that amplify the video input and conduct the same to sync stripper transistors Q103 and Q104. The video signal is removed, and the remaining channel 5 sync signal is supplied to the free-running multivibrator that includes transistors Q105 and Q106. This multivibrator, which has a natural frequency of oscillation that is slightly lower than the sync signal frequency, locks in on the synchronizing signal and drives the one-shot multivibrator circuit including transistors Q107 and Q108 at a frequency corresponding to the channel 5 sync signal. The output from the one-shot multivibrator is fed through the driver stage including transistors Q110 and Q111 that serve to lower the output impedance, whereupon the modulating signal is supplied to the modulators 34 via resistor 46. This modulator input is applied to the base of transistor Q302 via junction 48.

Supplied to the other input terminal of modulator 34 is the pilot carrier signal provided from the generator 36, which signal is applied to the base of transistor Q301 via capacitor C301 and junction 50. The modulator transistors are so biased that transistor Q301 is conductive only upon the application of a modulating pulse to the base of transistor Q302 so that the modulator output signal supplied to the mixer 40 from the top of potentiometer R304 comprises a series of RF pulses the frequency of which corresponds to the sync signal frequency of channel 5.

In accordance with an important feature of the present invention, compensating means are provided for compensating for the effects produced by the absence of a signal on channel 5 (such as might occur, for example, if channel 5 went off the air). To this end, a portion of the modulating signal is tapped off at junction 54 and is applied to the base of power detector transistor Q201 via DC level detecting means including diodes CR201 and CR202. Transistor Q201, which is normally biased to cutoff becomes conductive upon the application of a modulating pulse to apply a control feedback signal to the base of one-shot multivibrator transistor Q108 via resistor R125, transistor Q109 and resistor R122. The operation of the pulse width control means is such that the greater the average DC level of the modulating pulses, the greater is the magnitude of the control current, and the less is the width of the modulating pulses. Consequently, in the event that channel 5 should go off the air, the frequency of the modulating pulses would decrease, the magnitude of the control current would decrease, and the width of the modulating pulses would increase. Consequently, the average level of the modulating pulses is maintained generally the same for changes in frequency of the synchronizing signal of channel 5.

While the described system utilizes the horizontal blanking interval, it is apparent that the vertical interval could be used equally as well. Other modifications and embodiments may be made in the apparatus described without deviating from the inventive concept set forth above.

We claim:

1. In a wide band multichannel color television distribution system including a plurality of signal processing means associated with each of said channels, respectively, each of said channels including a synchronizing signal mixed with a video information signal, first mixer means for mixing the output signals of said signal processing means to define a composite signal, and at least one trunkline amplifier means for amplifying said composite signal, the gain of said trunkline amplifier means being responsive to the level of a pilot carrier signal; the improvement which comprises pilot carrier generator means (36) for generating said pilot carrier signal;

sync stripper means (24) connected with a selected one of said signal processing means for separating the synchronizing signal from the channel signal processed thereby;

pulse generator means (30, 32) for generating a pulse signal that is a function of the separated synchronizing signal of said selected channel;

pulse modulator means (34) for pulse modulating said pilot carrier signal with said pulse signal to produce a pulse modulated signal;

and second mixer means (40) connected in series between said first mixer means and said trunkline repeater amplifier means for mixing said pulse modulated signal with the composite signal produced by said first mixer means.

2. Apparatus as defined in claim 1, wherein said modulator means is normally in a cutoff state, said pulse generator means being operable in response to said separated synchronizing signal for periodically triggering said modulator means to a conducting state.

3. Apparatus as defined in claim 2, wherein said pulse generator means includes free-running multivibrator means locked on said synchronizing signal, and one-shot multivibrator means operable by said free-running multivibrator means to produce said modulating pulses at the frequency of said synchronizing signal.

4. Apparatus as defined in claim 3, and further including compensating means for controlling the width of the modulating pulses to compensate for deviation in the operation of said pulse generator means in the absence of a signal on said given channel.

5. Apparatus as defined in claim 4, wherein said compensating means comprises means for generating a control signal as a function of the average direct-current level of said modulating signal, and pulse width control means for varying the conductive period of said one-shot multivibrator means.

6. Apparatus as defined in claim 5, wherein said compensating means further includes temperature responsive means for varying said control signal as a function of variations in ambient temperature.